United States Patent [19]

Sato et al.

[11] Patent Number: 4,640,664
[45] Date of Patent: Feb. 3, 1987

[54] METHODS OF CONTROLLING OPERATION OF MULTISTAGE HYDRAULIC MACHINES

[75] Inventors: Shinsaku Sato, Ebina; Ichiro Yamagata, Yokohama, both of Japan

[73] Assignee: Tokyo Shibaura Denki Kabushiki Kaisha, Kawasaki, Japan

[21] Appl. No.: 588,362

[22] Filed: Mar. 12, 1984

[30] Foreign Application Priority Data

Mar. 15, 1983 [JP] Japan .................................. 58-42690
Mar. 15, 1983 [JP] Japan .................................. 58-42691
Mar. 15, 1983 [JP] Japan .................................. 58-42692
Mar. 15, 1983 [JP] Japan .................................. 58-42693

[51] Int. Cl.$^4$ ............................................. F01D 17/00
[52] U.S. Cl. ........................................ 415/1; 415/29; 415/500
[58] Field of Search ................... 415/1, 15, 16, 17, 20, 415/29, 50, 500

[56] References Cited

U.S. PATENT DOCUMENTS 4,472,103 9/1984 Yamagata et al. ....................... 415/1
4,487,549 12/1984 Takakusagi et al. ............... 415/1 X

FOREIGN PATENT DOCUMENTS

2904410 8/1979 Fed. Rep. of Germany .......... 415/1
3300978 7/1983 Fed. Rep. of Germany .
34965 4/1981 Japan .................................. 415/500

*Primary Examiner*—Edward K. Look
*Assistant Examiner*—Joseph M. Pitko
*Attorney, Agent, or Firm*—Schwartz, Jeffery, Schwaab, Mack, Blumenthal & Evans

[57] ABSTRACT

A multistage hydraulic machine in which respective pressure stages are connected in series through return passages and the highest and lowest pressure stages of the hydraulic machine are provided with movable guide vanes the degrees of openings of which are variable is controlled for load regulation or water flow rate regulation under a normal operation condition of the hydraulic machine by controlling degrees of openings of the movable guide vanes of the highest and lowest pressure stages in accordance with several control modes.

10 Claims, 19 Drawing Figures

METHODS OF CONTROLLING OPERATION OF MULTISTAGE HYDRAULIC MACHINES

BACKGROUND OF THE INVENTION

This invention relates to a method for controlling the operation of a multistage hydraulic machine and, more particularly, to a method for controlling and adjusting a load or water flow rate of water in a steady operating condition of a multistage hydraulic machine, generally a pump/turbine, in which all pressure stages are interconnected through return passages and the highest and lowest pressure stages are provided with movable guide vanes.

In a known multistage hydraulic machine in which all pressure stages are provided with runners and interconnected respectively through return passages, the operation or running control of the multistage hydraulic machine is done by controlling the flow condition of water passing the respective pressure stages in accordance with the adjustment of degrees of openings of guide vanes provided on the peripheries of the runners of the respective pressure stages. However, with the multistage hydraulic machine of the type described above, it is extremely difficult because of constructional limitations to provide guide vanes on the outer peripheries of the runners of the corresponding pressure stages and to control the opening or closing of the guide vanes by a guide vane control unit which is connected to the guide vanes, which provides a problem for practical use of the multistage hydraulic machine.

Taking the above problem into consideration, in the other controlling method the stationary guide vanes having a constant degree of opening are usually located on the outer peripheral surface of a runner of each pressure stage and the adjustment of the water flow rate and machine control operation are performed by open-close control of the inlet valve provided at an inlet portion of the multistage hydraulic machine. However, in this method, the water flow condition at the periphery of the runner of each pressure stage cannot be properly adjusted in response to the flow rate of water passing there, so that in low and high flow-rate ranges apart from design points, hydraulic performance lowers and the hydraulic machine is operated under lowered overall hydraulic performance.

In order to obviate defects or problems described above, there has also been proposed a controlling method in which movable guide vanes are provided for either one of the highest and lowest pressure stages and the flow rates of water can be adjusted by regulating the degree of opening of the movable guide vanes. However, in this controlling method, there remain problems such as vibrations, noises and cavitation caused at the operation in the low flow-rate range.

There has further been proposed a multistage hydraulic machine provided with movable guide vanes, the degrees of openings of which can be controlled, at the highest and lowest pressure stages for achieving stable and reasonable high hydraulic performance. The multistage hydraulic machine having the highest and lowest pressure stages provided with the movable guide vanes, the degrees of openings of which can be controlled, has a relatively complicated water flow passage in comparison with that of a single stage hydraulic machine and it is also necessary to accurately control the degrees of openings of the movable guide vanes, because of two movable guide vane assemblies at two pressure stages, at a time of load adjustment and control under a normal operation of the multistage hydraulic machine. In a point of this view, in a case where the adjustment of the degrees of openings of the movable guide vanes cannot be accurately performed, head ratio or distribution on the runners of the respective stages becomes nonuniform, which may cause the lowering of the hydraulic performance of the multistage hydraulic machine and generate cavitation, vibrations and noises at the lowest pressure stage as well as increasing of water pressure.

SUMMARY OF THE INVENTION

An object of this invention is to provide a method of controlling operation of a multistage hydraulic machine in which load regulation under a normal operation condition can be done by controlling degrees of openings of movable guide vanes of the highest and lowest pressure stages.

Another object of this invention is to provide a method of controlling operation of a multistage hydraulic machine in which water flow rate regulation under a normal operation condition can be done by controlling degrees of openings of movable guide vanes of the highest and lowest pressure stages.

A further object of this invention is to provide a method of controlling degrees of openings of the movable guide vanes of the highest and lowest pressure stages to thereby prevent generation of cavitation, vibrations and noises and prevent abnormal pressure rise at the lowest pressure stage.

According to this invention in order to achieve the above and other objects, in one aspect thereof, there is provided a method of controlling operation of a multistage hydraulic machine in which respective pressure stages are connected in series through runners and return passages. The highest and lowest pressure stages are provided with movable guide vanes the degrees of openings of which are variable. The method comprises, for an aimed load or aimed flow rate under a normal operation condition of the multistage hydraulic machine, controlling the degree of opening of the movable guide vanes of either one of the highest and lowest pressure stages of the multistage hydraulic machine to a degree of opening of guide vanes corresponding to an aimed load or flow rate which satisfies a relative relation between the degree of opening of the guide vanes and a preliminarily prescribed load or flow rate. Further, the method comprises controlling the degree of opening of movable guide vanes of the other one of the highest and lowest pressure stages to a degree of opening satisfying a relative relation between the degrees of openings of the movable guide vanes of the highest and lowest pressure stages.

In another aspect of this invention, there is provided a method of controlling operation of a multistage hydraulic machine in which respective pressure stages are connected in series through runners and return passages and the highest and lowest pressure stages are provided with movable guide vanes having variable degrees of openings. The method comprises for an aimed load or flow rate regulation under a normal operation condition of the multistage hydraulic machine, controlling the degree of opening of movable guide vanes of either one of the highest and lowest pressure stages of the multistage hydraulic machine to a degree of opening of guide vanes corresponding to an aimed load or flow rate which satisfies a relative relation between degree of opening of guide vanes and a load or flow rate prescribed. The relative relation is such that a high performance operation under a predetermined head is achieved. Finally, the method comprises controlling the degree of opening of movable guide vanes of the other one of the highest and lowest pressure stages to a degree of opening thereof so as to satisfy a relative difference or relative ratio between an actual load (or flow amount) acting on the movable guide vanes of the other one pressure stage and the aimed load (or flow amount) which will be within a prescribed range which is preliminarily set.

In a further aspect of this invention there is provided a method of controlling operation of a multistage hydraulic machine of the type described above, which is characterized by the steps of, for a load or flow rate regulation under a normal operation condition of the multistage hydraulic machine, controlling the degree of opening of movable guide vanes of either one of the highest and lowest pressure stages of the multistage hydraulic machine to a degree of opening of guide vanes corresponding to an aimed load (or flow rate) which satisfies a relative relation between degree of opening of guide vanes and a load (or flow rate) prescribed so as to achieve a high performance operation under a predetermined head, and controlling the degree of opening of the movable guide vanes of the other one of the highest and lowest pressure stages to a degree of opening satisfying that a relative difference or relative ratio between an actual degree of opening of the movable guide vanes of the other one pressure stage and a degree of opening of guide vanes corresponding to the aimed load (or flow rate) will be within a prescribed range which is preliminarily set.

According to this invention, as described above, in the case of controlling or regulating a load or water flow rate under a normal operation condition of a multistage hydraulic machine, it is possible to control the degree of opening of the movable guide vanes of one pressure stage while controlling the degree of opening of the movable guide vanes of the other one pressure stage, so that the combination of the degrees of openings of the movable guide vanes of the two pressure stages can always be selected so as to satisfy the highest hydraulic operation performance, and the multistage hydraulic machine can be operated always with a high hydraulic performance under a steady operation condition of the hydraulic machine.

In addition, although adverse phenomena such as cavitations and swirls generally occur at a runner portion of the lowest pressure stage, since the head distribution of the respective pressure stages can always be controlled, these adverse phenomena can be avoided by controlling or regulating the degrees of openings of the movable guide vanes of the highest and lowest pressure stages by the method according to this invention.

Thus, according to the method of this invention, the multistage hydraulic machine can always be operated with high and reliable hydraulic performance including no abnormal pressure rising and cavitation, vibrations and noises caused at the lowest pressure stage.

DESCRIPTION OF THE PREFERRED EMBODIMENTS

One embodiment of the operation control method of a multistage hydraulic machine according to this invention will be described hereunder in conjunction with the accompanying drawings in which a Francis-type two-stage pump/turbine is illustrated.

Figure 1:
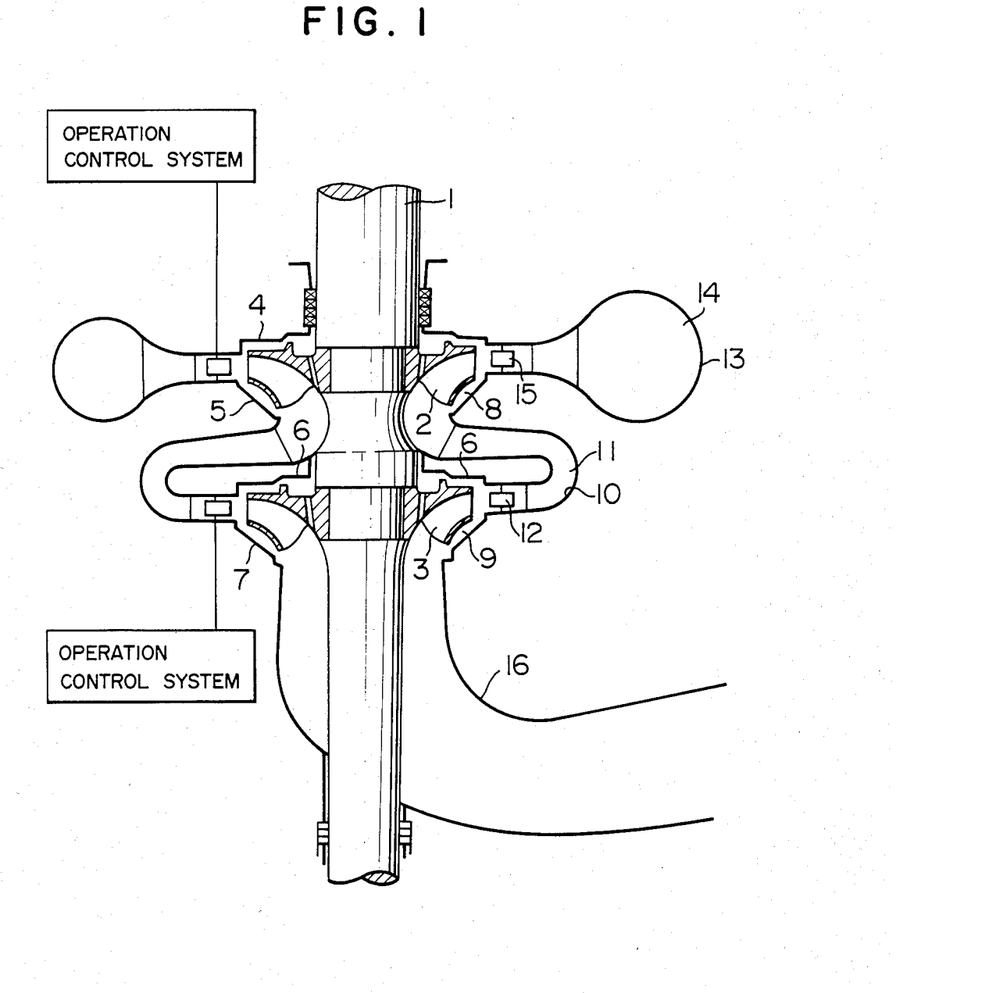
FIG. 1 shows an elevational view of a Francis-type two-stage pump/turbine adapted to the invention of this application.

Referring to FIG. 1, a runner 2 at a high pressure stage and a runner 3 at a low pressure stage are mounted on a turbine shaft 1 at axially spaced points. The runner 2 is covered with upper and lower covers 4 and 5 to thereby define a runner chamber 8 of the high pressure stage and the runner 3 is covered with upper and lower covers 6 and 7 to thereby define a runner chamber 9 of the low pressure stage. The runner chambers 8 and 9 are interconnected through a return passage 10 in which a return vane 11 is disposed. Movable guide vanes 12 of the low pressure stage having variable degree of opening are also located in the return passage.

A spiral casing 13 is arranged outside the runner chamber 8, which is communicated with a spiral chamber 14 of the casing 13. The inlet portion of the spiral chamber 14 is connected through an inlet valve, not shown, to a penstock which is operatively connected to an upper dam. On the outside of the runner 2 are arranged movable guide vanes 15 of the high pressure stage which have a variable degree of opening. The runner chamber 9 is connected to a draft tube 16 connected to a spillway, which is connected to a lower dam.

Referring to FIGS. 2 through 5, an operation control method of the two-stage pump/turbine shown in FIG. 1 when load adjustment or regulation is performed under a normal operation will be described hereunder according to this invention.

Water level difference, i.e. head, Hst between a water level of the upper dam and a water level of the lower dam is first detected by a water level detector 17 and a signal regarding the head Hst is inputted into an operation control device 18, into which data prescribing a relation between a load P and degree of opening A of the guide vanes has been preliminarily memorized through a data input device 19. The relation therebetween is obtained by a hydraulic performance model test with a parameter of the head Hst shown in FIG. 4 and when an aimed load Po is set, the degree of opening Ao of the guide vanes for realizing the aimed load Po is specified. The aimed load Po is set by transmitting an input signal to the operation control device 18 from an aimed load input device 20. An output signal representing the degree of opening Ao of the guide vanes obtained by the operation control device 18 is transmitted to a high pressure stage guide vane control device 21 to thereby set the degree of opening of the movable guide vane 15 of the high pressure stage to a value Ao.

As described above, by controlling the degree of opening of the movable guide vanes of the high pressure stage so as to have a value Ao corresponding to the aimed load Po, the guide vanes of the runners 2 and 3 of the high and low pressure stages have relatively different degrees of the openings, whereby head distribution ratio and actual flow rate vary.

The control of the degree of opening of the movable guide vanes 12 of the low pressure stage, according to this first embodiment of the present invention, is performed by taking into consideration the fact that the pump/turbine can be stably operated with high hydraulic performance when the degrees of openings of the movable guide vanes 15 and 12 of the high and low pressure stages satisfy a certain constant relative relation.

Figure 5:
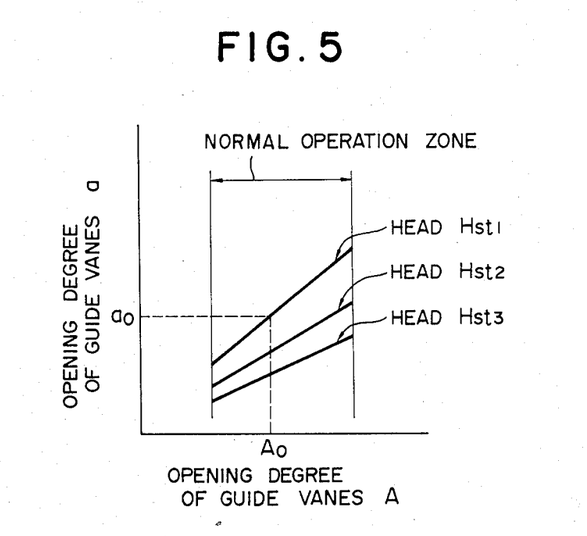
FIG. 5 is a graph showing a relative relation between the degrees of openings of the movable guide vanes of the high and low pressure stages of the pump/turbine shown in FIG. 1.

In other words, the relation between the degree of opening A of the movable guide vanes 15 and the degree of opening a of the movable guide vanes 12 can be obtained by a hydraulic performance model test with a parameter of the head Hst as shown in FIG. 5. For example, it will be noted that, in a case where a head is, for example, $Hst_1$ the pump/turbine is operated with most stable hydraulic performance when the movable guide vanes 15 of the high pressure stage take a degree of opening Ao and the movable guide vanes 12 of the low pressure stage take a degree of opening $a_0$.

Figure 3:
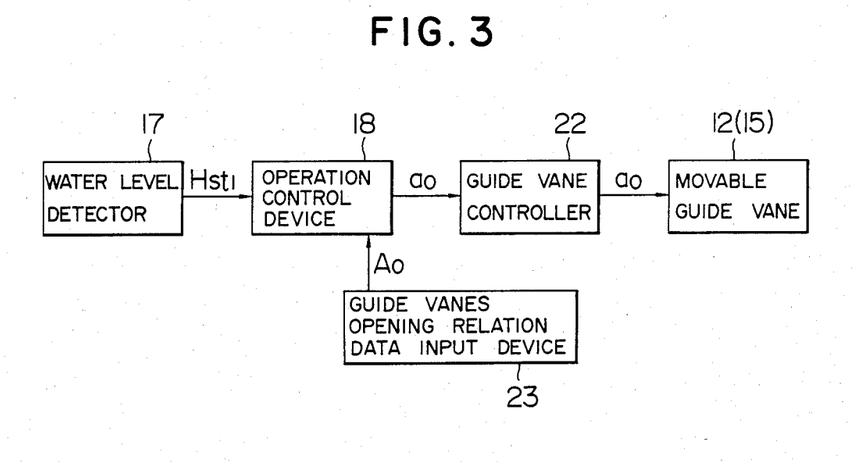

The relation between the degrees of openings A of the movable guide vanes 15 and the degrees of opening a of the movable guide vanes 12 is preliminarily obtained and memorized in the operation control device 18 through an input device 23 for degrees of openings of the guide vanes as shown in FIG. 3. The head Hst between the water levels of the upper and lower dams is detected by the water level detector 17 and a signal representing the head Hst is inputted into the operation control device 18. Thus, the degree of opening $a_0$ of the movable guide vanes 12 of the low pressure stage corresponding to the degree of opening Ao of the movable guide vanes 15 of the high pressure stage at a time of a head $Hst_1$, for example, can be determined in accordance with the relation regarding the degrees of openings of the movable guide vanes preliminarily memorized in the operation control device 18. An output signal representing the degree of opening $a_0$ is given to a low pressure stage guide vane control device 22 is thereby set a degree of opening of the low pressure stage to have a value $a_0$.

According to this embodiment of the present invention, a multistage pump/turbine can be operated with a stable hydraulic performance under an aimed load by controlling the degree of opening of the movable guide vanes 15 of the high pressure stage in response to control instructions regarding the degree of opening Ao corresponding to the aimed load Po, and by controlling the degree of opening of the movable guide vanes 12 of the low pressure stage to take a degree of opening $a_0$ satisfying the relative relation to the degree of opening Ao of the movable guide vanes of the high pressure stage.

In the embodiment described above, although the control instructions regarding the degree of opening of the guide vanes corresponding to the aimed load are given to the movable guide vanes 15 of the high pressure stage, the control instructions can also be given to the movable guide vanes 12 of the low pressure stage. In other words, signals representing the aimed load Po and the head $Hst_1$, for example, detected by the water level detector 17 are inputted into the operation control device 18 and the degree of opening Ao of the guide vanes corresponding to the aimed load Po decided with a parameter of a head is predetermined. A control signal in response to the degree of opening Ao is transmitted to a guide vane control device 21 from the operation control device 18 to thereby control the degree of opening of the movable guide vanes 12 of the low pressure stage.

Regarding the control of the movable guide vanes 15 of the high pressure stage, a water level detecting signal from the water level detecting device 17 is inputted into the operation control device 18 and the degree of opening $a_0$ of the movable guide vanes 15 of the high pressure stage corresponding to the degree of opening Ao of the movable guide vanes 12 of the low pressure stage under the operation condition with the head $Hst_1$ is controlled. The degree of opening of the movable guide vanes of the high pressure stage is then set to "$a_0$" by means of the guide vane control device 22.

It will be understood that the control method described above with respect to the load can be adapted for a control method with respect to a water flow rate. The control method regarding the water flow rate will be described hereunder in conjunction with FIGS. 6 and 7.

Figure 6:
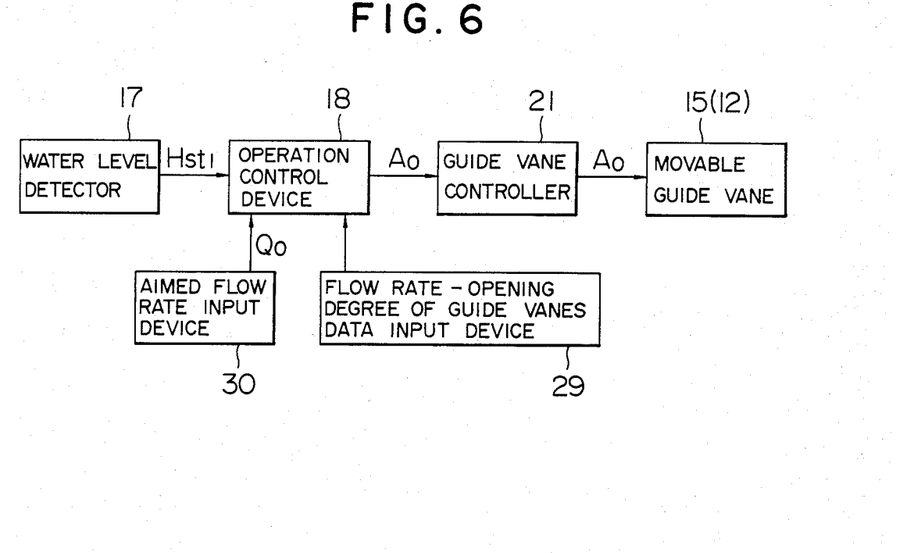
FIG. 6 is a block diagram showing a flow rate control system under a normal operation of the pump/turbine shown in FIG. 1.
Figure 7:
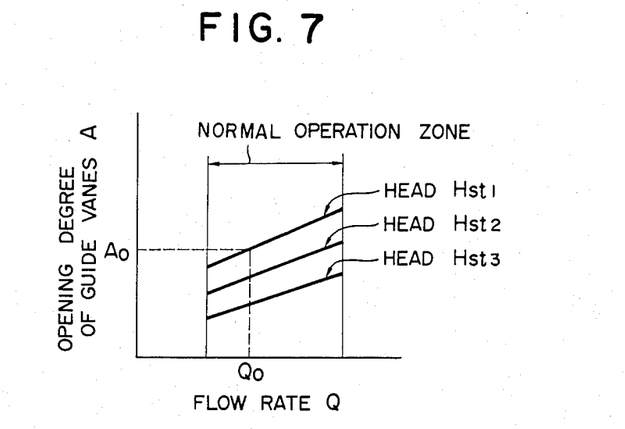
FIG. 7 is a graph showing a relation between the water flow rate and the degree of opening of the guide vanes of the pump/turbine shown in FIG. 1.

As shown in FIG. 6, a head Hst between the upper and lower dams is detected by the water level detecting device 17 and a signal representing the head Hst is inputted into the operation control device 18. In the operation control device 18 is preliminarily memorized data prescribing the relation between a flow rate Q and degree of opening A of guide vanes through a data input device 29. The relation therebetween can be obtained by a hydraulic performance model test with a parameter of head Hst as shown in FIG. 7 and when an aimed flow rate Qo is set, degree of opening Ao of the guide vanes for realizing the aimed flow rate Qo is specified. The aimed flow rate Qo is set by transmitting a signal from an aimed flow rate input device 30 to the operation control device 18. An output signal representing the degree of opening Ao is obtained by the operation control device 18 is given to the high pressure stage guide vane control device 21 to thereby set the degree of opening of the movable guide vanes 15 of the high pressure stage to be "Ao". The degrees of openings of the guide vanes of the runners 2 and 3 of the high and low pressure stages differ relatively by controlling the movable guide vanes 15 of the high pressure stage to have a value Ao corresponding to the flow rate Qo, and accordingly, the head distribution ratio and actual flow rate also vary.

A method of controlling the degree of opening of the movable guide vanes 12 of the low pressure stage regarding the water flow rate is substantially identical to that referred to with respect to the load control and the method can be achieved by controlling the movable guide vanes 12 of the low pressure stage so that the degrees of openings of the movable guide vanes 15 and 12 may satisfy the predetermined constant relation. Namely, since the relative relation between the degrees of openings A and a of the movable guide vanes of the high and low pressure stages can be obtained by the hydraulic performance model test with a parameter of head Hst as shown in FIG. 5, the degree of opening ao of the movable guide vanes 12 of the low pressure stage corresponding to the degree of opening Ao of the movable guide vanes of the high pressure stage operated under the head $Hst_1$ can be decided by inputting and storing the relative relation into the operation control device 18 through the relative relation input device 23, detecting at the same time the head Hst between the water levels of the upper and lower dams, and inputting a signal regarding the detected Hst into the operation control device 18.

The control instructions of the degree of opening Ao of the guide corresponding to the aimed flow rate Qo are given to the movable guide vanes 15 of the high pressure stage and the control instructions of the degree of opening $a_0$ of the guide vanes satisfying the relative relation to the degree Ao of the movable guide vanes 15 are given to the movable guide vanes 12 of the low pressure stage. In this manner, the control of the degrees of openings of the movable guide vanes of the high and low pressure stages can be controlled and the two-stage pump/turbine can be operated with a stable hydraulic performance.

In the embodiment described above, although the control instructions regarding the degree of opening of the guide vanes corresponding to the aimed flow rate are first given to the movable guide vanes 15 of the high pressure stage, it will of course be noted that the control instructions can be first given to the movable guide vanes 12 of the low pressure stage.

Another (second) embodiment of the operation control method of a multistage pump/turbine regarding a load will be described hereunder in conjunction with FIGS. 8 through 14 in which a Francis-type two-stage pump/turbine is also referred to for convenience sake.

This embodiment aims at the control of the degree of opening of the movable guide vanes of either one of the high and low pressure stages so that the degree of opening to be controlled is within a prescribed range of a relative difference or relative ratio between an aimed value and an actual value.

One example of the second embodiment in case of controlling or adjusting the load under a steady operation condition will be described hereunder with reference to FIG. 2.

Figure 4:
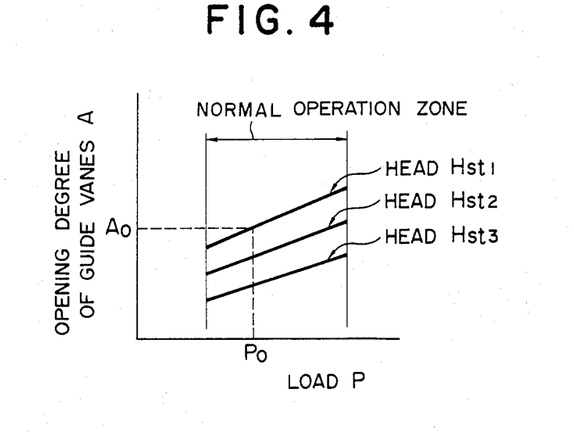
FIG. 4 is a graph showing a relation between a load and a degree of opening of guide vanes of the pump/turbine shown in FIG. 1.

The head Hst between the water levels of the upper and lower dams is first detected by the water level detecting device 17 and a signal representing the head Hst is inputted and stored in the operation control device 18. Data regarding a relation between a load P and degree of opening a of guide vanes is preliminarily stored in the operation control device 18 through a data input device 19. The relation therebetween is obtained by a hydraulic performance mode test with a parameter of head Hst as shown in FIG. 4 and the degree of opening Ao of the guide vanes is specified for realizing a load by setting the aimed load Po, in response to an input signal transmitted from an aimed load input device 20 to the operation control device 18. An output signal representing the degree of opening Ao of the guide vanes obtained by the operation control device 18 is given to a high pressure stage guide vane control device 21 to thereby control the movable guide vanes 15 of the high pressure stage to have the degree of opening Ao.

In accordance with the control of the guide vanes corresponding to the aimed load of the movable guide vanes 15 of the high pressure stage, the degree of opening of the guide vanes relatively differs, and accordingly, a head distribution ratio and an actual load also vary.

Figure 8:
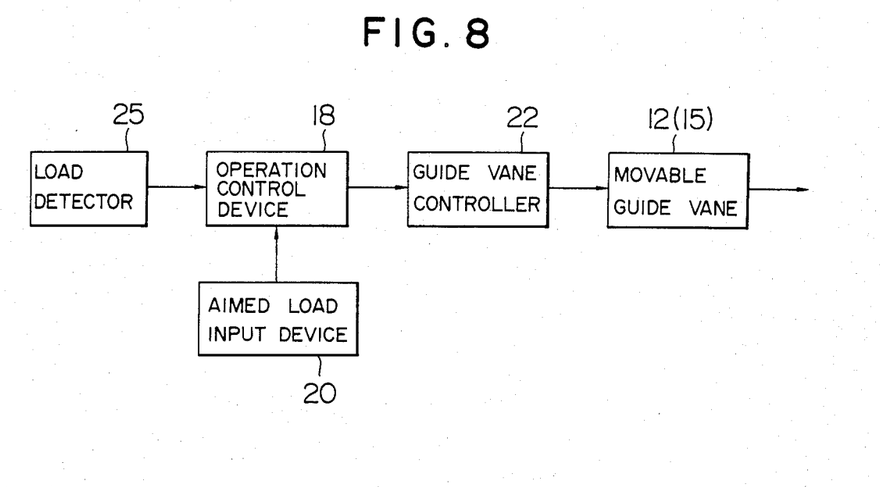
FIG. 8 is a block diagram showing a load control system of the pump/turbine shown in FIG. 1.
Figure 9:
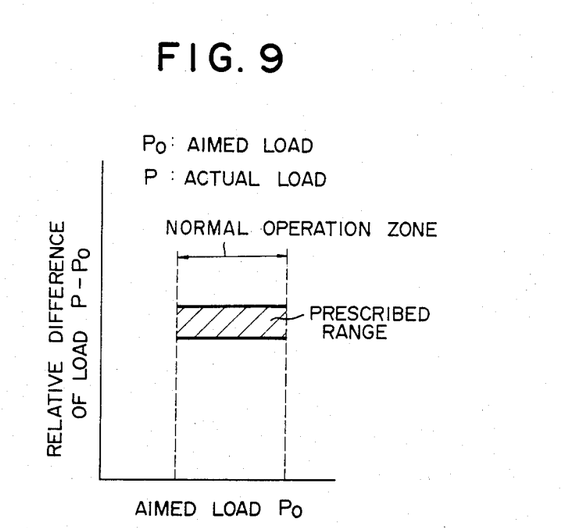
FIGS. 9 and 10 are graphs showing relative relations between the load and the relative difference of the load and between the load and the relative ratio of the load, respectively.
Figure 10:
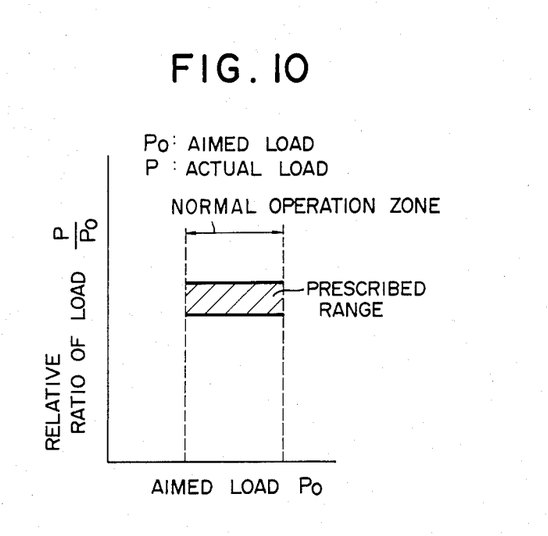

The control of the degree of opening of the movable guide vanes 12 of the low pressure stage can be performed as shown in FIG. 8 by detecting an actual load by using a load detecting device 25 and inputting a signal representing the detected actual load into the operation control device 18. In the operation control device 18, is preliminarily stored a result obtained by an experiment regarding a relation of relative difference (P−Po) between the actual load P with respect to the aimed load Po and the aimed load Po as shown in FIG. 9. A result preliminarily obtained by an experiment regarding a relation of relative ratio (P/Po) between the actual load P with respect to the aimed load Po and the aimed load Po is also stored in the operation control device 18 as shown in FIG. 10. The degree of opening of the movable guide vanes 12 of the low pressure stage can be controlled so that the relative difference (P−Po) or relative ratio (P/Po) of the load is within a prescribed rectangular range shown in FIG. 9 or 10 and the aimed load is set by transmitting an input signal from the aimed load input device 20 to the operation control device 18. The movable guide vanes 12 of the low pressure stage are then set to have degree of opening a by the low pressure stage guide vane control device 22 operated by the output from the operation control device 18.

Namely, if the relative difference or relative ratio is beyond the prescribed range which is preliminarily decided for achieving the operation at each pressure stage with a high hydraulic performance under a good head distribution condition, the movable guide vanes 12 of the low pressure stage are controlled to be closed. On the other hand, if the relative difference or relative ratio is below the prescribed range, the movable guide vanes 12 are controlled to be opened.

According to the second embodiment of the control method of this invention, the two-stage pump/turbine can be operated under a predetermined aimed load by controlling the degree of opening of the movable guide vanes 15 of the high pressure stage in response to the control instructions of the degree of opening of the guide vanes corresponding to the aimed load, while controlling the degree of opening of the movable guide vanes 12 of the low pressure stage in response to the control instructions of the relative difference or relative ratio between the actual load and the aimed load. Although with the example described above the control instructions of the degree of opening of the guide vanes corresponding to the aimed load are given to the movable guide vanes 15 of the high pressure stage, the control instructions can of course be given to the movable guide vanes 12 of the low pressure stage.

Namely, an operation water level, i.e. a head $Hst_1$ detected by the water level detecting device 17 and a signal representing the aimed load Po from the aimed load input device 20 are both inputted in the operation control device 18 to thereby decide the degree of opening $a_0$ of the guide vanes corresponding to the aimed load Po to be decided as a parameter of the head. Thus, the degree of opening of the movable guide vanes 12 of the low pressure stage can be controlled by transmitting a signal in response to the degree of opening $a_0$ from the operation control device 18 to the guide vane control device 21.

While, the degree of opening of the movable guide vanes 15 of the high pressure stage can be controlled by closing the movable guide vanes 15 when the relative difference or relative ratio between the aimed load and the actual load is beyond the prescribed range (FIGS. 9 and 10) which is preliminarily decided for achieving the operation of each pressure stage with a high hydraulic performance, and controlled by opening the movable guide vanes 15 when the relative difference or relative ratio is below the prescribed range. This open-close control of the movable guide vanes 15 of the high pressure stage can be done by the control instructions given from the operation control device 18 to the guide vane control device 23.

Figure 11:
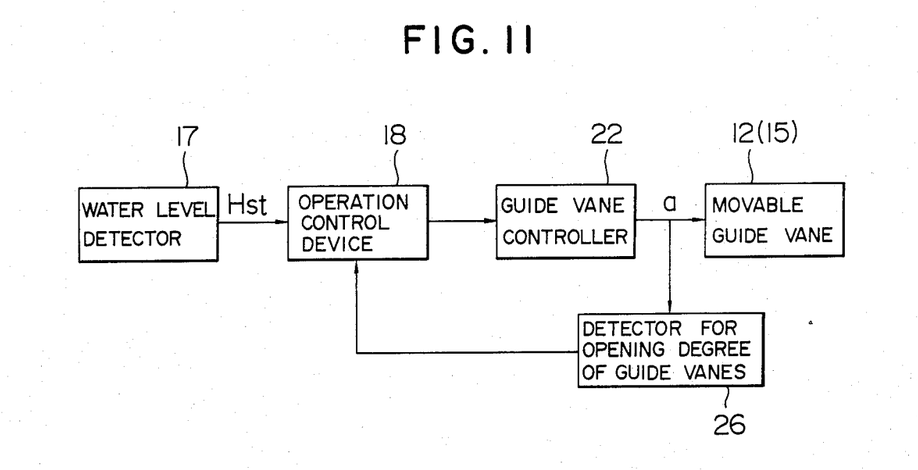
FIG. 11 is a block diagram showing a guide vane control system of the pump/turbine shown in FIG. 1.
Figure 12:
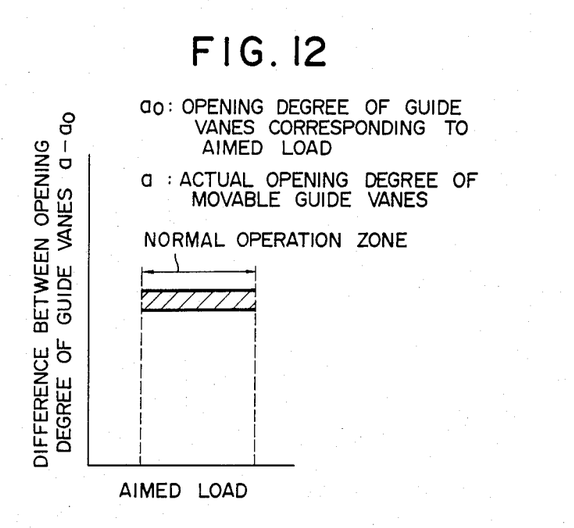
FIGS. 12 and 13 are graphs showing relations between the aimed load and the relative difference of the degree of opening of the guide vane and between the aimed load and the relative ratio of the degree of opening of the guide vanes, respectively.
Figure 13:
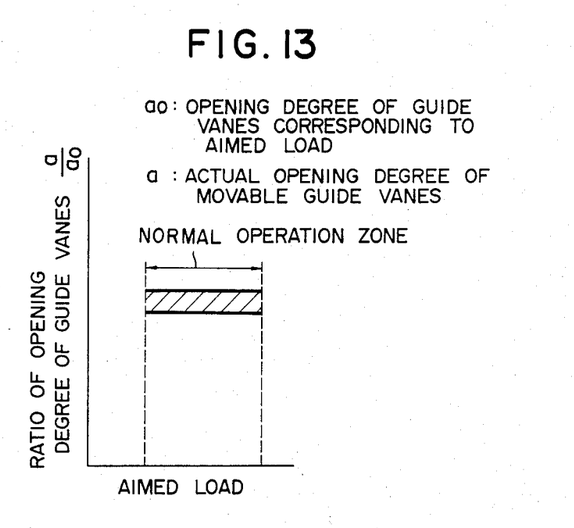

A further, third, embodiment of the guide vane control method according to this invention will be described hereunder in conjunction with FIG. 11 through FIG. 13, and with this embodiment, the degrees of openings of the movable guide vanes are controlled so that a relative difference or relative ratio between an actual degree of opening of movable guide vanes to be controlled and those corresponding to the aimed load will be within the prescribed range.

Figure 2:
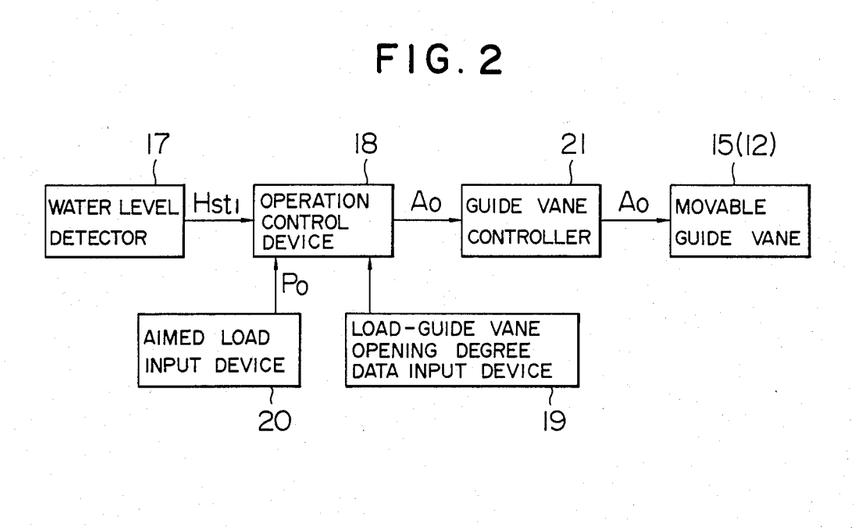
FIGS. 2 and 3 are block diagrams for showing load control systems under a normal operation of the pump/turbine shown in FIG. 1.

Namely, in a case where it is required to control or regulate the load under a normal operation of a multistage (two-stage in this embodiment) pump/turbine, as shown in FIG. 2, a water level difference, i.e. head Hst, between the water levels of the upper and lower dams is first detected by the water level detecting device 17, which then generates a signal regarding the detected head Hst into the operation control device 18 into which data regarding the relation between the load P and the degree of opening a of the guide vanes has preliminarily stored as described hereinbefore with respect to the other embodiments of this invention. An aimed load can be set by an input signal from the aimed load input device 20 to the operation control device 18. In addition, an input signal obtained by the operation control device 18 regarding the degree of opening Ao of the guide vanes is given to the high pressure stage guide vane control device 22 to thereby set the degree of opening of the movable guide vanes 15 of the high pressure stage to have a value Ao.

In accordance with the control of the degree of opening of the movable guide vanes 15 of the high pressure stage corresponding to the aimed operation load, the degrees of openings of the guide vanes of the runners 2 and 3 of the high and low pressure stages differ relatively, so that the actual flow rate as well as the head distribution ratio will also vary. The control of the degree of opening of the movable guide vanes 12 at the low pressure stage can be achieved, as shown in FIG. 11, by detecting first an actual degree of opening a of the movable guide vanes 12 with a device 26 for detecting the degree of opening of the guide vanes and inputting a signal representing the detected degree of opening a into the operation control device 18. In the operation control device 18 is preliminarily stored an experiment data regarding a relative difference $(a-a_0)$ or a relative ratio $(a/a_0)$ between the actual degree of opening a and the degree of opening $a_0$ corresponding to an aimed load for the stable hydraulic performance as shown in FIGS. 12 and 13. In order to carry out the stable operation of the pump/turbine with a high hydraulic performance, the guide vanes 12 of the low pressure stage should be controlled so that the relative difference $(a-a_0)$ and the relative ratio $(a/a_0)$ are within the prescribed ranges shown in FIGS. 12 and 13, respectively. The aimed load is set by an input signal from the aimed load input device 20 to the operation control device 18. The obtained result is inputted from the operation control device 18 into the low pressure stage guide vane control device 22 to thereby set the degree of opening of the movable guide vanes 12 of the low pressure stage to have a value a.

Namely, the movable guide vanes 12 of the low pressure stage are controlled to be closed when the relative difference or relative ratio is beyond the prescribed range at each pressure stage and to be opened when the relative difference or relative ratio is below the prescribed range.

As described above, the pump/turbine can be operated under the predetermined aimed load by giving control instructions corresponding to the aimed load to the guide vanes 15 of the high pressure stage, and at the same time, by giving control instructions regarding the relative difference or relative ratio between the actual degree of opening and the degree of opening corresponding to the aimed load to the movable guide vanes 12 of the low pressure stage.

Figure 14:
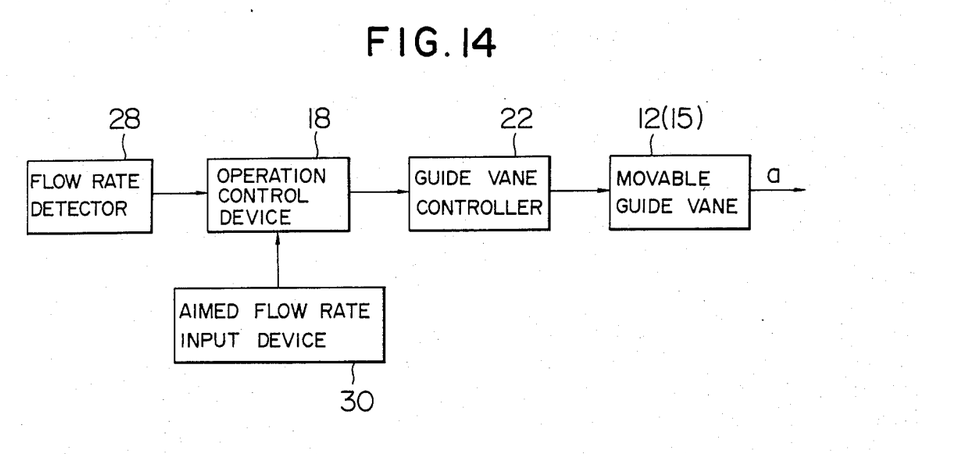
FIG. 14 is a block diagram showing a flow rate control system of the pump/turbine shown in FIG. 1.
Figure 15:
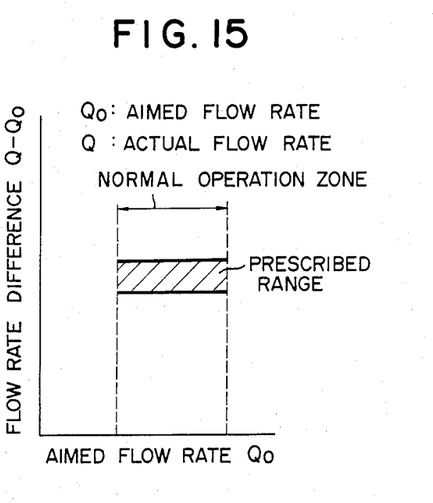
FIGS. 15 and 16 are graphs showing relations between the aimed flow rate and the relative difference of the flow rate and between the aimed flow rate and the relative ratio of the flow rate, respectively.
Figure 16:
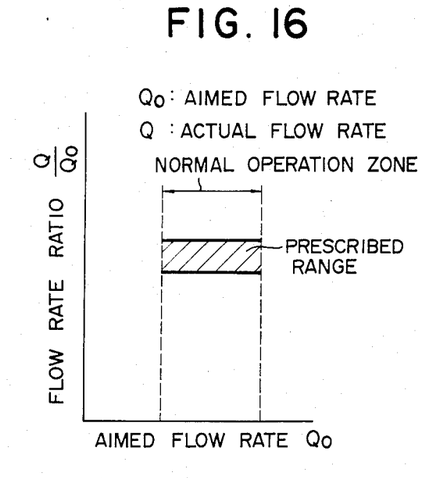

In the example of the third embodiment of this invention described above, a load control method was developed and the method can be applied to a flow amount control method, which will be described in detail hereunder in conjunction with FIG. 14 through FIG. 16.

In this example, the degree of opening of the movable guide vanes 15 of the high pressure stage can be controlled by substantially the same manner as described with reference to FIG. 6, in which the water level difference, i.e. head $Hst_1$ between the upper and lower dams is first detected and a signal regarding the detected head Hst is inputted into the operation control device 18. Data regarding a relation between the water flow rate Q and the degree of opening a of the guide vanes has been preliminarily stored into the operation control device 18 through a device for inputting data regarding the relation described above. This relation can be obtained by a hydraulic performance model test with a parameter of head Hst as shown in FIG. 7 and the degree of opening Ao for realizing an aimed flow rate is specified by preliminarily setting the aimed flow rate Q, which is set by transmitting a signal from an aimed flow rate input device 30 into the operation control device 18. An input signal representing the degree of opening Ao of the guide vanes obtained by the operation control device 18 is given to the guide vane control device 21 to thereby set the degree of opening Ao of the movable guide vanes 15 of the high pressure stage.

In accordance with the control of the degree of opening of the movable guide vanes 15 of the high pressure stage to that corresponding to the aimed flow rate, the degrees of openings of the movable guide vanes of the runners 2 and 3 relatively differ and the actual flow rate as well as the head distribution ratio will also vary.

The control of the degree of opening of the movable guide vanes 12 of the low pressure stage according to the third embodiment of this invention will be performed by the following manner. An actual water flow rate through the movable guide vanes 12 of the low pressure stage is detected by a flow rate detecting device 28 in use of ultrasonic waves, and a signal regarding the detected flow rate is inputted into the operation control device 18 as shown in FIG. 4. In the operation control device 18 are preliminarily stored results obtained by an experiment regarding a relation of relative difference $(Q-Qo)$ and relative ratio $(Q/Qo)$ between an actual flow rate Q with respect to the aimed flow rate Qo and the aimed flow rate as shown in FIGS. 15 and 16, respectively. Thus, the degree of opening of the movable guide vanes 12 of the low pressure stage will be controlled so that the relative difference $(Q-Qo)$ and the relative ratio $(Q/Qo)$ are within the prescribed rectangular ranges shown in FIGS. 15 and 16, respectively. The aimed flow rate Qo is set by giving an input signal from the aimed flow rate input device 30 into the operation control device 18 and the result obtained from the control device 18 is given to the low pressure stage guide vane control device 22 to thereby set the degree of opening a of the movable guide vanes 12 of the low pressure stage.

Namely, the movable guide vanes 12 of the low pressure stage are controlled to be closed when the relative difference or the relative ratio regarding the flow amount is beyond the prescribed range preliminarily set for the head distribution for the high hydraulic performance operation, and are controlled to be opened when the relative difference or relative ratio is below the prescribed range. As described above, the multistage (two-stage in this embodiment) pump/turbine can be operated with the predetermined aimed flow rate by controlling the degree of opening of the movable guide vanes 15 of the high pressure stage in accordance with the control instructions regarding the degree of opening corresponding to the aimed flow rate, and by also controlling the degree of opening of the movable guide vanes 12 of the low pressure stage in accordance with the control instructions regarding the relative difference or relative ratio with respect to the actual flow rate and the aimed flow rate.

Figure 17:
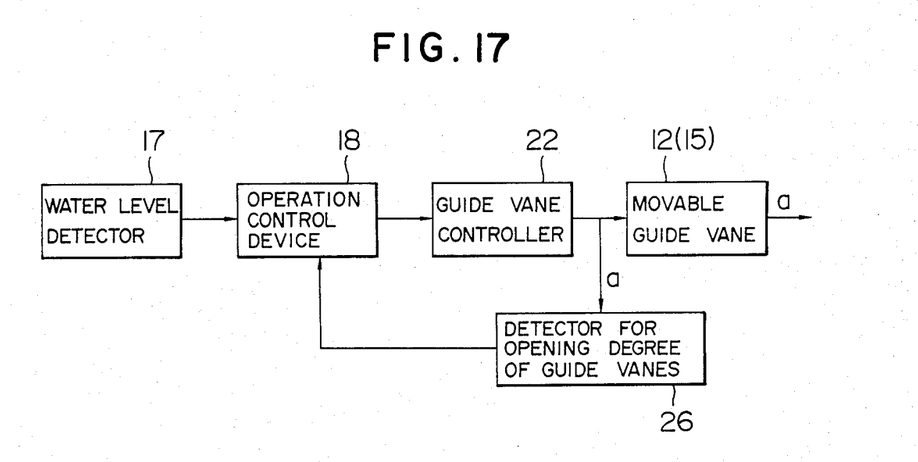
FIG. 17 is a block diagram showing a guide vane control system of the pump/turbine shown in FIG. 1.
Figure 18:
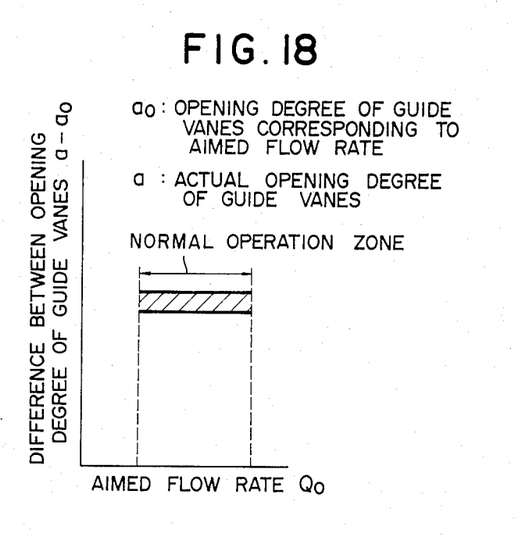
FIGS. 18 and 19 are graphs showing relations between the aimed flow rate and the relative difference of the degree of opening of the guide vanes and between the aimed flow rate and the relative ratio thereof, respectively.
Figure 19:
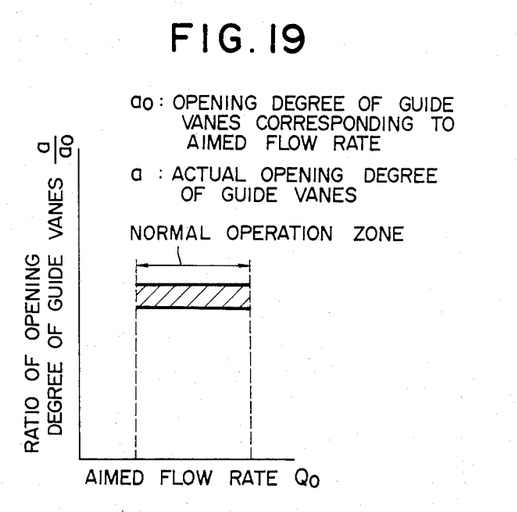

A still further, fourth, embodiment of the guide vane control method according to this invention will be described hereunder in conjunction with FIGS. 17 through 19, in which the movable guide vanes are controlled so that a relative difference or relative ratio between an actual degree of opening of the movable guide vanes to be controlled and degree of opening thereof corresponding to an aimed flow rate is within a prescribed range.

Namely, as shown in FIG. 6 showing an example of flow rate control or regulation under a normal operation condition, a water level difference, i.e. head $Hst_1$ between the upper and lower dams is first detected by the water level detecting device 17 and a signal regarding the detected head Hst is inputted into the operation control device 18, into which data regarding a relation between the flow rate Q and the degree of opening a of the guide vanes has preliminarily been stored. The flow rate Q and the degree of opening a are obtained by a hydraulic performance model test with a parameter of head Hst as shown in FIG. 7 and when the aimed flow rate Qo has been set, the degree of opening $a_0$ for realizing the aimed flow rate can be specified. The aimed flow rate is set by giving an input signal from an aimed flow rate input device 30 into the operation control device 18. In addition, an input signal representing the degree of opening $a_0$ obtained by the operation control device 18 is transmitted to the high pressure stage guide vane control device 21 to thereby set the degree of opening $a_0$ of the movable guide vanes 15 of the high pressure stage.

In accordance with the control of the degree of opening of the movable guide vanes 15 of the high pressure stage corresponding to the aimed operation flow rate, the degrees of openings of the runners 2 and 3 of the high and low pressure stages differ relatively, so that the actual flow rate as well as the head distribution ratio will also vary.

While, regarding the control of the degree of opening of the movable guide vanes 12 of the low pressure stage according to the fourth embodiment of this invention, the actual degree of opening a of the movable guide vanes 12 is detected by a degree of opening detecting device 26, and a signal representing the detected degree of opening a is inputted into the operation control device 18. In the operation control device 18, is preliminarily stored as a result of an experiment regarding a relative difference $(a-a_0)$ and a relative ratio $(a/a_0)$ between an actual degree of opening a for performing a hydraulically stable operation and a degree of opening $a_0$ of guide vanes corresponding to the aimed flow rate as shown in FIGS. 18 and 19. In order to carry out the hydraulically stable operation, the movable guide vanes 12 of the low pressure stage should be controlled so that the relative difference and the relative ratio are within prescribed rectangular ranges as shown in FIGS. 18 and 19. An aimed flow rate is set in response to an input signal from the aimed flow rate input device 20 into the operation control device 18. In addition, a result obtained by the operation control device 18 is given to the low pressure stage guide vane control device 22 to thereby set the degree of opening a of the movable guide vanes 12 of the low pressure stage.

Namely, the movable guide vanes 12 are controlled to be closed when the relative difference or relative ratio regarding the degree of opening of the movable guide vanes of each pressure stage is beyond the prescribed range for a high performance operation, and are controlled to be opened when the relative difference or relative ratio is below the prescribed range.

Accordingly, the multistage (two-stage in this embodiment) pump/turbine can be operated with the predetermined aimed flow rate by controlling the degree of opening of the movable guide vanes 15 of the high pressure stage in accordance with control instructions regarding the degree of opening corresponding to the aimed flow rate, and also by controlling the degree of opening of the movable guide vanes 12 of the low pressure stage in accordance with control instructions regarding the relative difference or relative ratio between the actual degree of opening and that corresponding to the aimed flow rate.

According to this invention, although, as described hereinbefore, a Francis-type two-stage pump/turbine is referred to, the guide vane control methods can be applied to other multistage pump/turbine having pressure stages more than two, in which the movable guide vanes of the highest and lowest pressure stages are controlled in accordance with the control modes as referred to the embodiments described hereinbefore.

What is claimed is:

1. A method of controlling the operation of a multistage hydraulic machine for aimed load adjustment under a normal operation condition in which respective pressure stages are connected in series through runners and return passages and highest and lowest pressure stages are provided with movable guide vanes having variable degrees of openings, said method comprising the steps of:

controlling the degree of opening of movable guide vanes of one of the highest and lowest pressure stages of the multistage hydraulic machine to a degree of opening corresponding to an aimed load and satisfying a relative relation between degrees of opening of said highest and lowest pressure stage movable guide vanes for achieving a high performance operation under a predetermined head; and controlling the degree of opening of movable guide vanes of the other one of the highest and lowest pressure stages to a degree of opening satisfying a relative relation between the degrees of openings of the movable guide vanes of the highest and lowest pressure stages for maintaining a hydraulically stable operation under a predetermined head.

2. A method of controlling operation of a multistage hydraulic machine for aimed flow rate adjustment under normal operation condition in which respective pressure stages are connected in series through runners and return passages and highest and lowest pressure stages are provided with movable guide vanes having variable degrees of openings said method comprising the steps of:

controlling the degree of opening of movable guide vanes of one of the highest and lowest pressure stages of the multistage hydraulic machine to a degree of opening corresponding to an aimed flow rate and satisfying a relative relation between degrees of opening of said highest and lowest pressure stage guide vanes for achieving a high performance operation under a predetermined head; and controlling the degree of opening of movable guide vanes of the other one of the highest and lowest pressure stages to a degree of opening satisfying a relative relation between the degrees of openings of the movable guide vanes of the highest and lowest pressure stages for maintaining a hydraulically stable operation under a predetermined head.

3. A method of controlling operation of a multistage hydraulic machine for aimed load adjustment under a normal operation condition in which respective pressure stages are connected in series through runners and return passages and highest and lowest pressure stages are provided with movable guide vanes having variable degrees of openings, said method comprising the steps of:

controlling the degree of opening of movable guide vanes of one of the highest and lowest pressure stages of the multistage hydraulic machine to a degree of opening corresponding to an aimed load and satisfying a relative relation between degrees of opening of said highest and lowest pressure stage guide vanes for achieving a high performance operation under a predetermined head; and controlling the degree of opening of movable guide vanes of the other one of the highest and lowest pressure stages to a degree of opening satisfying one of a relative difference and a relative ratio between an actual load acting on the movable guide vanes of said other one pressure stage and said aimed load said one of said relative difference and relative ratio being confined within a predetermined range.

4. The method according to claim 3 wherein the movable guide vanes of said other one of highest and lowest pressure stages are controlled to be closed when said one of said relative difference and relative ratio is beyond said predetermined range and wherein the movable guide vanes of said other one of pressure stages are controlled to be opened when said one of said relative difference and relative ratio is below said predetermined range to thereby control and adjust a load of the multistage hydraulic machine.

5. A method of controlling operation of a multistage hydraulic machine for load adjustment under a normal operation condition in which respective pressure stages are connected in series through runners and return passages and highest and lowest pressure stages are provided with movable guide vanes having variable degrees of openings, said method comprising the steps of:

controlling the degree of opening of movable guide vanes of one of the highest and lowest pressure stages of the multistage hydraulic machine to a degree of opening corresponding to an aimed load and satisfying a relative relation between degrees of opening of highest and lowest pressure stage guide vanes for achieving a high performance operation under a predetermined head; and controlling the degree of opening of movable guide vanes of the other one of the highest and lowest pressure stages to a degree of opening satisfying one of a relative difference and relative ratio between an actual degree of opening of the movable guide vanes of said other one of the highest and lowest pressure stages and a predetermined degree of opening of guide vanes for achieving an aimed load said one of said relative difference and relative ratio being confined within a predetermined range.

6. The method according to claim 5 wherein the movable guide vanes of said other one of highest and lowest pressure stages are controlled to be closed when said one of said relative difference and relative ratio is above said predetermined range and the movable guide vanes of said other one of said highest and lowest pressure stages are controlled to be opened when said relative difference or relative ratio is below said prescribed range.

7. A method of controlling operation of a multistage hydraulic machine for aimed flow rate adjustment under a normal operation condition in which respective pressure stages are connected in series through runners and return passages and highest and lowest pressure stages are provided with movable guide vanes the degrees of openings of which are variable, said method comprising the steps of:

controlling the degree of opening of movable guide vanes of one of the highest and lowest pressure stages of the multistage hydraulic machine to a degree of opening corresponding to an aimed flow rate and satisfying a relative relation between degrees of opening of said highest and lowest pressure stage guide vanes and for achieving a high performance operation under a predetermined head; and controlling the degree of opening of movable guide vanes of the other one of the highest and lowest pressure stages to a degree of opening satisfying one of a relative difference and a relative ratio between an actual flow rate acting on the movable guide vanes of said other one of said highest and lowest pressure stage and said aimed flow rate said one of said relative difference and relative ratio being confined to a predetermined range.

8. The method according to claim 7 wherein the movable guide vanes of said other one of said highest and lowest pressure stages are controlled to be closed when said one of said relative difference and relative ratio is above said prescribed range and the movable guide vanes of said other one of pressure stages are controlled to be opened when said relative difference or relative ratio is below said prescribed range to thereby control and adjust the load of the multistage hydraulic machine.

9. A method of controlling operation of a multistage hydraulic machine for aimed flow rate adjustment under a normal operation condition in which respective pressure stages are connected in series through runners and return passages and highest and lowest pressure stages are provided with movable guide vanes having variable degrees of openings, said method comprising the steps of:

controlling the degree of opening of movable guide vanes of one of the highest and lowest pressure stages of the multistage hydraulic machine to a degree of opening corresponding to an aimed flow rate and satisfying a relative relation between degrees of opening of said highest and lowest pressure stage guide vanes and for achieving a high performance operation under a predetermined head; and controlling the degree of opening of movable guide vanes of the other one of the highest and lowest pressure stages to a degree of opening satisfying one of a relative difference and relative ratio between an actual degree of opening of the movable guide vanes of said other one pressure stage and the degree of opening of guide vanes corresponding to said aimed flow rate said one of said relative difference and relative ratio being confined within a predetermined range.

10. The method according to claim 9 wherein the movable guide vanes of said other one of pressure stages are controlled to be closed when said one of said relative difference and relative ratio is above said predetermined range and the movable guide vanes of said other one of said highest and lowest pressure stages are controlled to be opened when said one of said relative difference and relative ratio is below said predetermined range.

* * * * *